(12) United States Patent
Saulsbury et al.

(10) Patent No.: US 8,937,885 B2
(45) Date of Patent: Jan. 20, 2015

(54) METHODS AND APPARATUS FOR DYNAMIC MAPPING OF POWER OUTLETS

(75) Inventors: Ashley Saulsbury, Los Gatos, CA (US); Michael O'Gorman, San Carlos, CA (US); Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1039 days.

(21) Appl. No.: 12/969,110

(22) Filed: Dec. 15, 2010
(Under 37 CFR 1.47)

(65) Prior Publication Data
US 2012/0155328 A1 Jun. 21, 2012

(51) Int. Cl.
*H04L 12/28* (2006.01)
*H04L 12/12* (2006.01)
*H04L 12/46* (2006.01)
*H04L 12/24* (2006.01)
*H04L 12/931* (2013.01)

(52) U.S. Cl.
CPC ............ *H04L 12/12* (2013.01); *H04L 12/4625* (2013.01); *H04L 41/0663* (2013.01); *H04L 49/40* (2013.01); *Y02B 49/40* (2013.01); *Y04S 40/166* (2013.01)
USPC ........................................................ 370/255

(58) Field of Classification Search
None
See application file for complete search history.

(56) References Cited

U.S. PATENT DOCUMENTS

| | | | |
|---|---|---|---|
| 2005/0017846 A1* | 1/2005 | Butler et al. | 340/310.01 |
| 2009/0234512 A1* | 9/2009 | Ewing et al. | 700/295 |
| 2011/0072289 A1* | 3/2011 | Kato | 713/324 |
| 2011/0270461 A1* | 11/2011 | Van Heuklon et al. | 700/297 |
| 2011/0291478 A1* | 12/2011 | Cochran et al. | 307/43 |
| 2011/0291813 A1* | 12/2011 | Jansma | 340/10.5 |

\* cited by examiner

*Primary Examiner* — Ian N Moore
*Assistant Examiner* — Brian T Le
(74) *Attorney, Agent, or Firm* — Cooley LLP (57) ABSTRACT

In some embodiments, an apparatus includes a network management module. The network management module is configured to send a request for power output data from a first network element having a first power supply configured to be coupled to a first power outlet, and a second power supply configured to be coupled to a second power outlet. The network management module is configured to receive a first confirmation from the first network element that the first power supply and the second power supply are receiving power. The network management module is configured to send a request to disable a third power outlet and to receive, after sending the request to disable the third power outlet, a second confirmation from the first network element that the first power supply and the second power supply are receiving power. The network management module is configured to define a power distribution table after receiving the second confirmation, the power distribution table designating the third power outlet as unused.

10 Claims, 7 Drawing Sheets

| Power Outlet | Compute Device | Power Supply |
|---|---|---|
| 171 | Unassigned | Unassigned |
| 172 | Unassigned | Unassigned |
| 173 | Unassigned | Unassigned |
| 174 | Unassigned | Unassigned |
| 175 | Unassigned | Unassigned |
| 176 | Unassigned | Unassigned |
| 177 | Unassigned | Unassigned |
| 178 | Unassigned | Unassigned |
| 179 | Unassigned | Unassigned |
| 180 | Unassigned | Unassigned |

| Power Outlet | Compute Device | Power Supply |
|---|---|---|
| 171 | 150 | 1 |
| 172 | 150 | 2 |
| 173 | 152 | 1 |
| 174 | 152 | 2 |
| 175 | 154 | 1 |
| 176 | 154 | 2 |
| 177 | 156 | 1 |
| 178 | 156 | 2 |
| 179 | Unused | Unused |
| 180 | Unused | Unused |

METHODS AND APPARATUS FOR DYNAMIC MAPPING OF POWER OUTLETS

BACKGROUND

Some embodiments described herein relate generally to power distribution within a computer network, and, in particular, to dynamic mapping of power outlets of a computer network.

Some known computer networks include components that use power from an external power source. These components can receive power from the external power source through power distribution units, e.g., multiple network-enabled outlet power strips. These power distribution units enable a computer network to remotely and selectively enable and disable power to power outlets on the power distribution unit. Some known components of computer networks receive power from the power source via a local power supply that can manipulate the power coming from the power source before delivery to the component. Some known components include two local power supplies for uninterrupted power in the event of a single power supply failure.

Some known computer networks include a large number of components and associated power distribution units. Some known computer networks can have components and/or power distribution units added or removed to perform maintenance, replace, or upgrade the network, components, and/or power distribution units. While it can be beneficial to know the power outlet/power supply combination for each component, the computer networks may be too large and/or may change to often to accurately track. Furthermore, when a component of a computer network fails, or otherwise becomes non-operational, it can be difficult to shut down that component.

Accordingly, a need exists for apparatus and methods to efficiently map the power outlet/power supply combinations for components within a computer network, and to efficiently disable non-operational components.

SUMMARY OF THE INVENTION

In some embodiments, an apparatus includes a network management module. The network management module is configured to send a request for power output data from a first network element having a first power supply configured to be coupled to a first power outlet, and a second power supply configured to be coupled to a second power outlet. The network management module is configured to receive a first confirmation from the first network element that the first power supply and the second power supply are receiving power. The network management module is configured to send a request to disable a third power outlet and to receive, after sending the request to disable the third power outlet, a second confirmation from the first network element that the first power supply and the second power supply are receiving power. The network management module is configured to define a power distribution table after receiving the second confirmation, the power distribution table designating the third power outlet as unused.

DETAILED DESCRIPTION

In some embodiments, an apparatus includes a network management module. The network management module is configured to send a request for power output data from a first network element having a first power supply configured to be coupled to a first power outlet and a second power supply configured to be coupled to a second power outlet. The network management module is configured to receive a first confirmation from the first network element that the first power supply and the second power supply are receiving power. The network management module is configured to send a request to disable a third power outlet and to receive, after sending the request to disable the third power outlet, a second confirmation from the first network element that the first power supply and the second power supply are receiving power. The network management module is configured to define a power distribution table after receiving the second confirmation, the power distribution table designating the third power outlet as unused.

In some embodiments, a system includes a power distribution unit and a first network element. The power distribution unit includes multiple power outlets. The power distribution unit is configured to be operatively coupled to a first network segment and a second network segment. The first network element is associated with the first network segment and includes a first power supply configured to be coupled to a first power outlet from the multiple power outlets, and a second power supply configured to be coupled to a second power outlet from the multiple power outlets. The first network element is configured to define a power distribution table based on a coupling of the first power supply and the first power outlet and based on a coupling of the second power supply and the second outlet.

In some embodiments, the system includes a non-transitory processor-readable medium storing code representing instructions to cause a processor to send a request for power output data from a first network element that includes a first power supply coupled to a first power outlet and a second power supply coupled to a second power outlet. The non-transitory processor-readable medium storing code representing instructions to cause a processor further receive at a first time a confirmation from the first network element that the first power supply and the second power supply are receiving power, and to send at a second time, after the first time, a request to disable the first power outlet. The non-transitory processor-readable medium storing code representing instructions to cause a processor further receive at a third time, after the second time, a confirmation from the first network element that the first power supply is not receiving power and the second power supply is receiving power, and define, after the third time, a power distribution table associating the first power supply of the first network element with the first outlet.

As used herein, the term "physical hop" can include a physical link between two modules and/or devices. For example, a communication path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the network topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device. In some embodiments, for example, the first protocol can be a packet-based data link layer protocol (i.e., that transmits variable length data packets and/or frames) and the second protocol can be a cell-based data link layer protocol (i.e., that transmits fixed length data cells and/or frames).

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be connected to adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

Figure 1:
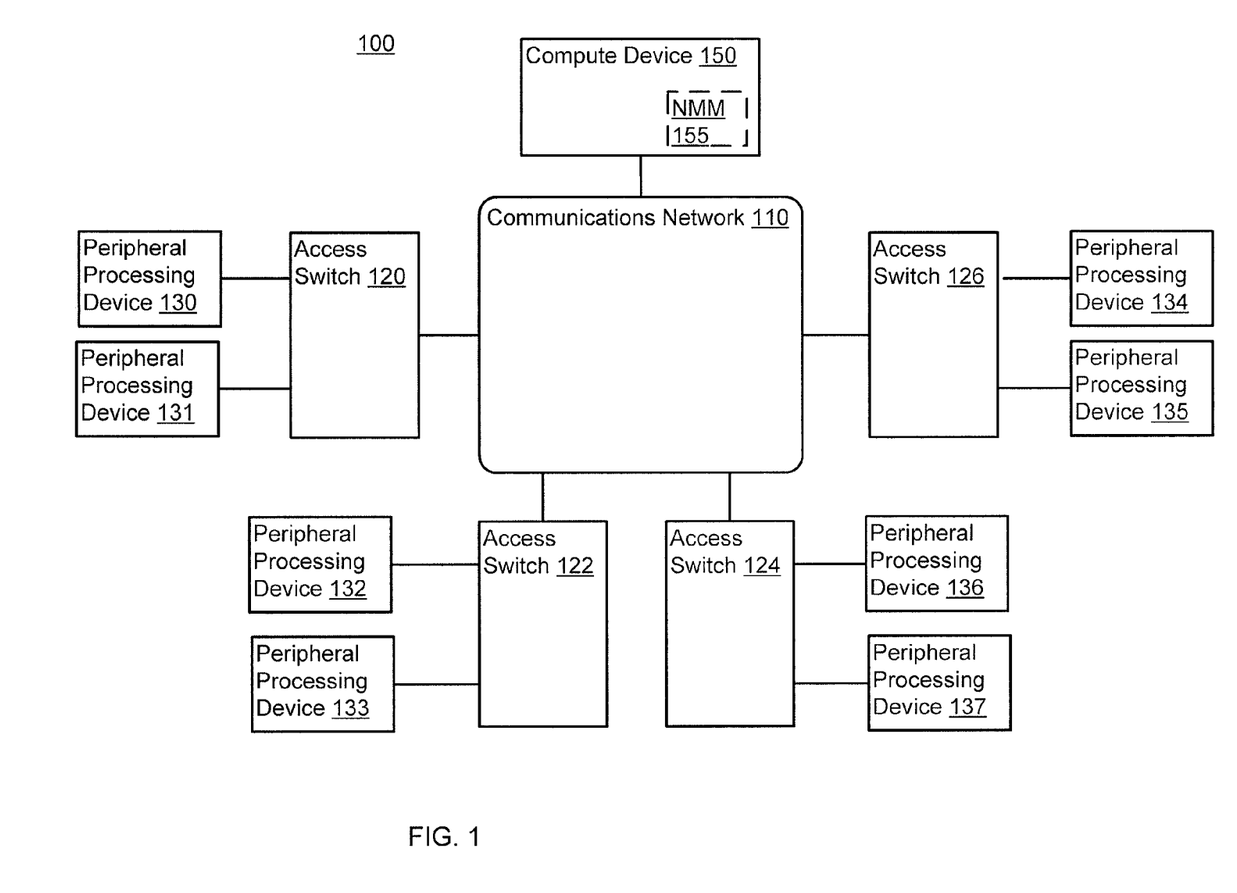
FIG. 1 is a system block diagram of a switch fabric system, according to an embodiment.

FIG. 1 is a schematic diagram that illustrates a switch fabric system 100, according to an embodiment. The switch fabric system 100 includes a communications network 110, multiple access switches 120, 122, 124, 126, a compute device 150 and multiple peripheral processing devices 130-137 and can function as a distributed network switch. The peripheral processing devices 131-137 are operatively coupled to each other by remaining portions of the switch fabric system 100. The peripheral processing devices 131-137 can be, for example, compute nodes, service nodes, routers, and storage nodes, as described in further detail herein. In some embodiments, for example, the peripheral processing devices 131-137 include servers, storage devices, gateways, workstations, compute devices and/or the like.

The peripheral processing devices 131-137 can be operatively coupled to one or more of the access switches 120, 122, 124, 126 using any suitable connection such as, for example, an optical connection (e.g., an optical cable and optical connectors), an electrical connection (e.g., an electrical cable and electrical connectors) and/or the like. As such, the peripheral processing devices 130-137 are configured to send data (e.g., data packets, data cells, etc.) to and receive data from the access switches 120, 122, 124, 126. In some embodiments, each connection between the peripheral processing devices 130-137 and the respective access switches 120, 122, 124, 126 is a direct link. Such a link can be said to be a single physical hop link. In other embodiments, the peripheral processing devices can be operatively coupled to the access switches via intermediate modules. Such a connection can be said to be a multiple physical hop link.

Each access switch 120, 122, 124, 126 can be any device configured to operatively couple peripheral processing devices 130-137 to the communications network 110. In some embodiments, for example, the access switches 120, 122, 124, 126 can be edge devices, input/output modules, top-of-rack devices, network elements and/or the like. Each access switch 120, 122, 124, 126 can be physically located with a chassis of the switch fabric system 100. In some embodiments, for example, each access switch 120, 122, 124, 126 can be located within the same chassis. In other embodiments, each access switch 120, 122, 124, 126 can be located within a different chassis. Structurally, the access switches 120, 122, 124, 126 can function as both source access switches and destination access switches. Accordingly, the access switches 120, 122, 124, 126 can send data (e.g., a data stream of data packets and/or data cells) to and receive data from a data plane portion of the communications network 110, and to and from the respective connected peripheral processing devices 130-137.

Each of the access switches 120, 122, 124, 126 is configured to communicate with the other access switches 120, 122, 124, 126 via a data plane portion of the communications network 110. Specifically, the data plane portion of the communications network 110 is configured to provide any-to-any connectivity between the access switches 120, 122, 124, 126 at relatively low latency. For example, the data plane portion of the communications network 110 can be configured to transmit (e.g., convey) data between access switches 120,

122, 124, 126. In some embodiments, the communications network 110 can have at least hundreds or thousands of ports (e.g., egress ports and/or ingress ports) through which access switches 120, 122, 124, 126 can transmit and/or receive data.

The communications network 110 can be any suitable communications network that operatively couples the access switches 120, 122, 124, 126 to the other access switches 120, 122, 124, 126. Additionally, the communications network can operatively couple the compute device 150 to the access switches 120, 122, 124, 126. In some embodiments, the communications network 110 includes a data plane portion and a control plane portion. The control plane portion of the communications network 110 facilitates transmission of control signals (e.g., containing forwarding-state information and/or configuration information).

The data plane portion of the communications network 110 facilitates transmission of data between access switches 120, 122, 124, 126. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can be configured to operate as a single logical entity (e.g., a single logical network element). Similarly stated, the data plane of the communications network 110 can define part of a single logical hop between a first access switch 120, 122, 124, 126 and a second access switch 120, 122, 124, 126 (e.g., along with the data paths between the access switches 120, 122, 124, 126 and the data plane portion of the communications network 110). The data plane portion of the communications network 110 can be configured to couple (e.g., indirectly connect, facilitate communication between) the peripheral processing devices 130-137. In some embodiments, the data plane portion of the communications network 110 can be configured to communicate via interface devices (not shown) that can transmit data at a rate of at least 10 Gb/s. In some embodiments, the data plane portion of the communications network 110 can be configured to communicate via interface devices (e.g., Fibre-Channel interface devices) that can transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In some embodiments, the network management module 155 can store (e.g., in a memory) a configuration file associated with configuration information (e.g., port protocol information, network segment assignment information, port assignment information, peripheral processing device information, etc.) and/or associated with forwarding-state information (e.g., port identifiers, network segment identifiers, peripheral processing device identifiers, etc.) associated with the switch fabric system 100.

Figure 2:
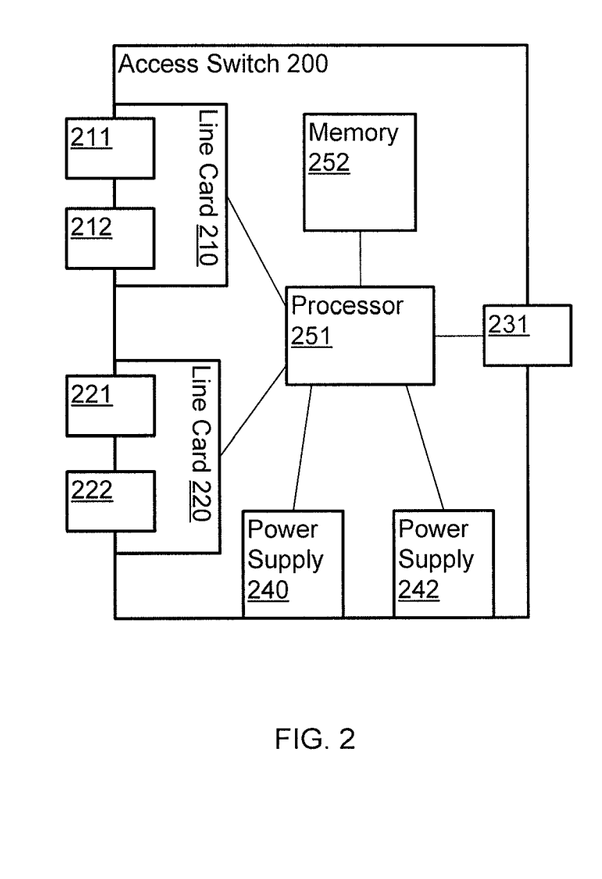
FIG. 2 is a schematic illustration of an access switch of a switch fabric system, according to another embodiment.

FIG. 2 is a system block diagram of an access switch 200 similar to the access switches 120, 122, 124, 126. The access switch 200 includes processor 251, memory 252, line card 210, line card 220, port 231, a first power supply 240, and a second power supply 242. Processor 251 is operatively coupled to memory 252, line card 210, line card 220, port 231, power supply 240, and power supply 242. Line card 210 includes ports 211 and 212. Line card 220 includes ports 221 and 222. In some embodiments, line cards 210 and/or 220 include one or more processors and/or memories (not shown).

Similar to the ports of the access switches 120, 122, 124, 126, ports 211, 212, 221 and 222 can be configured to communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can be configured to allow access switch 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, access switch 200 can be in communication with multiple peripheral processing devices using homogeneous or heterogeneous physical layers and/or protocols via ports 211, 212, 221 and 222.

Port 231 can be configured to be in communication with other access switches via a communications network such as a switch fabric (e.g., communications network 110). Port 231 can be part of one or more network interface devices (e.g., a 40 Gigabit (Gb) Ethernet interface, a 100 Gb Ethernet interface, etc.) through which the access switch 200 can send signals to and/or receive signals from a communications network. The signals can be sent to and/or received from the communications network via an electrical link, an optical link and/or a wireless link operatively coupled to the access switch 200. In some embodiments, the access switch 200 can be configured to send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can be configured to communicate with peripheral processing devices using a data link layer protocol based on data packets and port 231 can be configured to communicate via a switch fabric using a data link layer protocol based on data cells. Said differently, access switch 200 can be an edge device of a network switch fabric such as a distributed network switch fabric.

In some embodiments, the access switch 200 can be configured to prepare a data packet (e.g., an Ethernet frame and/or packet) to enter a data plane portion of a communications network (e.g., communications network 110). For example, the access switch 200 can be configured to forward, classify, and/or modify the packet encapsulation (e.g., modify, add and/or remove a header portion, footer portion and/or any other identifier included within the data packet) of a data packet prior to sending the data packet to the communications network. Additionally, the access switch 200 can be configured to partition and/or divide the data packet into data cells (e.g., having fixed length payloads) prior to sending the data cells to the switch fabric. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 4:
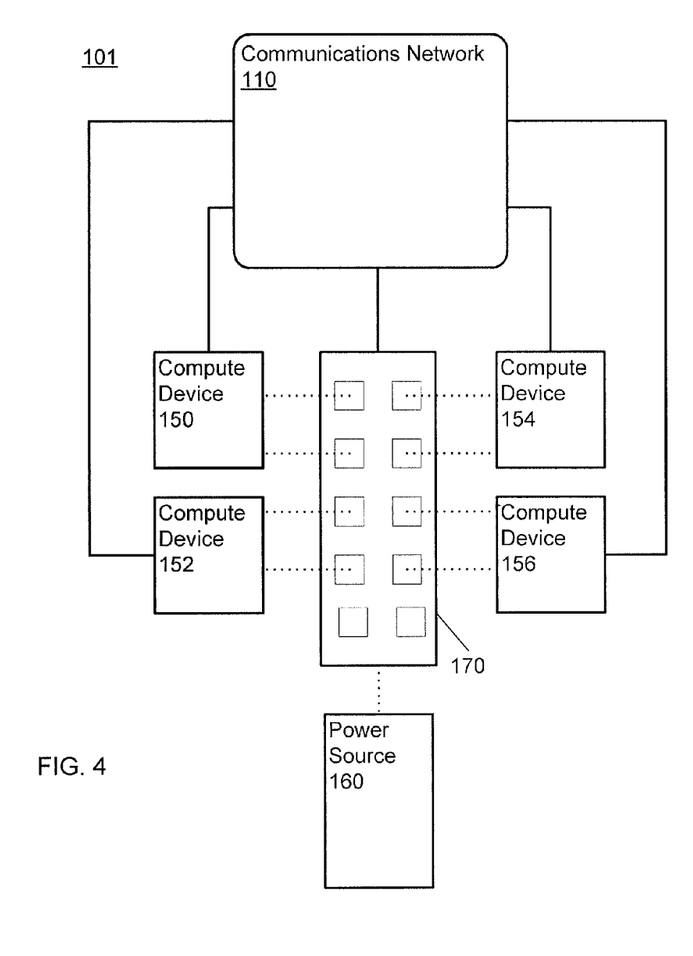
FIG. 4 is a system block diagram of a power distribution system, according to an embodiment.

First power supply 240 and second power supply 242 can be operatively coupled to processor 251 and can supply access switch 200 with electrical power from a power source 160 (shown in FIG. 4). First power supply 240 and second power supply 242 can be any power supply suitable for a switch or device usable in a network, (e.g. switch fabric 100). First power supply 240 and second power supply 242 can operate in parallel, and either first power supply 240 or second power supply 242 can act as the primary power supply or the secondary (e.g., backup) power supply. In this manner, if the electrical power from the power source 160 to the first power supply 240 is disabled and/or if first power supply 240 fails, access switch 200 can continue to receive power from second power supply 242. Similarly, if the electrical power from the power source 160 to the second power supply 242 is disabled and/or if second power supply 242 fails, access switch 200 can continue to receive power from first power supply 240. In some embodiments, transitioning from first power supply 240 to second power supply 242, and transitioning from second power supply 242 to first power supply 240 can be uninterrupted.

In some embodiments, first power supply 240 and second power supply 242 can be operatively coupled to processor 251 on a power plane, a data plane, and/or a control plane, as described herein. In this manner, access switch 200 can receive power via the first power supply 240 and the second power supply 242, can receive data via or process data regarding the first power supply 240 and the second power supply 242, and send control signals affecting the first power supply 240 and the second power supply 242.

Figure 3:
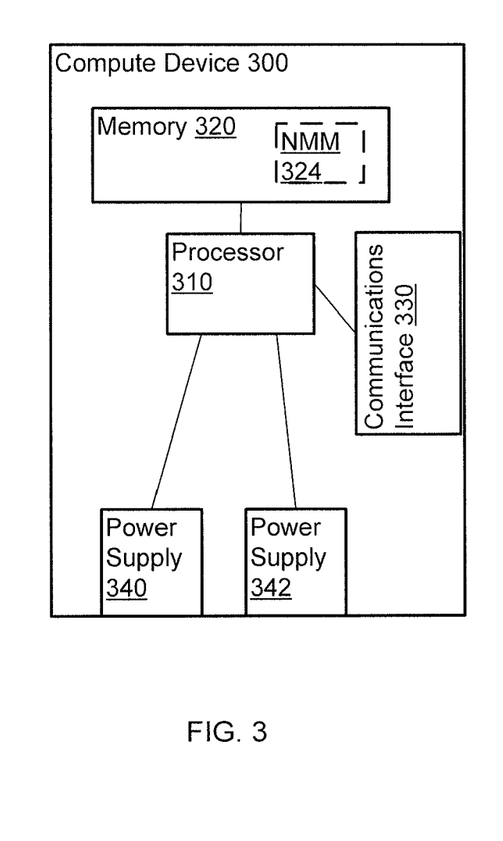
FIG. 3 is a schematic illustration of a compute device of a switch fabric system, according to another embodiment.

FIG. 3 is a system block diagram of a compute device 300 substantially similar to the compute device 150, according to an embodiment. Compute device 300 includes processor 310, memory 320, communications interface 330, a first power supply 340 and a second power supply 342. Processor 310 is operatively coupled to memory 320, communications interface 330, first power supply 340, and second power supply 342. Compute device 300 can communicate with other compute devices, peripheral processing devices and/or access switches via communications interface 330.

As illustrated in FIG. 3, compute device 300 can be configured to host a network management module 324 similar to the network management module 155 (shown in FIG. 1). In other words, network management module 324 can be a process, and application, a virtual machine, and/or some other software module (executing in hardware) or a hardware module that is executed at compute device 300. In some embodiments, for example, instructions that implement network management module 324 can be stored at memory 320 and executed at processor 310.

In some embodiments, compute device 300 can be dedicated to hosting network management module 324. In other words, compute device 300 can allocate all or substantially all of its computing resources (e.g., processing capacity and memory) to network management module 324. In some embodiments, compute device 300 can host other processes, applications, virtual machines, and/or software modules (executing in hardware) in addition to network management module 324. For example, compute device 300 can be a general purpose compute device or compute node that is configured to host multiple processes, applications, virtual machines, and/or software modules.

First power supply 340 and second power supply 342 can be similar to first power supply 240 and second power supply 242, as described above. First power supply 340 and second power supply 342 can be operatively coupled to processor 351 and can supply compute device 300 with electrical power from a power source 160 (shown in FIG. 4). First power supply 340 and second power supply 342 can be any power supply suitable for a switch or device usable in a network, (e.g. switch fabric 100), know in the art. First power supply 340 and second power supply 342 operate in parallel, and either first power supply 340 or second power supply 342 can act as the primary power supply or the secondary (e.g. backup) power supply. In this manner, if the electrical power from the power source 160 to the first power supply 340 is disabled and/or if first power supply 340 fails, compute device 300 and processor 310 can continue to receive power from second power supply 342. Similarly, if the electrical power from the power source 160 to the second power supply 342 is disabled and/or if second power supply 342 fails, compute device 300 and processor 310 can continue to receive power from first power supply 340. In some embodiments, transitioning from first power supply 340 to second power supply 342, and transitioning from second power supply 342 to first power supply 340 can be uninterrupted.

In some embodiments, first power supply 340 and second power supply 342 can be operatively coupled to processor 310 on a power plane, a data plane, and/or a control plane, as described herein. In this manner, compute device 300 can receive power via the first power supply 340 and the second power supply 342, can receive data via or process data regarding the first power supply 340 and the second power supply 342, and send control signals affecting the first power supply 340 and the second power supply 342.

FIG. 4 is a schematic diagram that illustrates a power distribution system 101, according to an embodiment. Power distribution system 101 can be the power plane portion the of switch fabric system 100 of FIG. 1. Power distribution system 101 can include similar components to, interact with, and overlap with, switch fabric system 100. The power distribution system 101 includes the communications network 110, multiple compute devices 150, 152, 154, 156, a power distribution unit 170, and a power source 160. While power distribution system 101 is shown as have four compute devices, it is contemplated that more or less compute devices can be used. Each of compute devices 152, 154, 156 can be similar to compute device 150 of FIG. 1 and compute device 300 of FIG. 3. Each of compute devices 150, 152, 154, 156 may operate the same portion of power distribution system 101 and/or a different portion of power distribution system 101. Said differently, in some embodiments, compute device 150 can operate as the primary compute device for a first portion of the power distribution system 101 and compute device 152 can operate as the primary compute device for a second portion of the power distribution system 101. In some embodiments, compute device 150 can operate the first portion of power distribution system 101 and can operate as a backup compute device for the second portion of the power distribution system 101. It is contemplated that any of compute devices 150, 152, 154, 156 can operate as a primary compute device and/or a backup compute device. The compute devices 150, 152, 154, 156 are operatively coupled to each other, and to the power distribution unit 170 by remaining portions of the power distribution system 101. In some embodiments, the compute devices 150, 152, 154, 156 are each operatively coupled to the power distribution unit 170 via at least one of power distribution units 171-180 (shown in FIG. 5).

Figure 5:
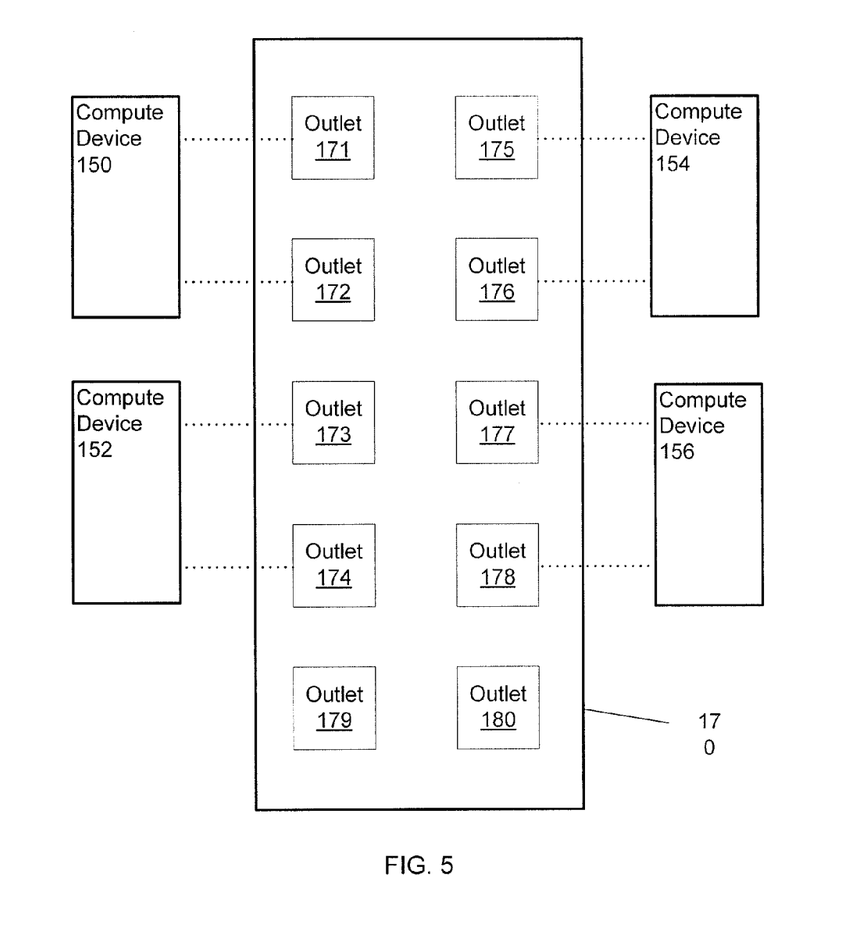
FIG. 5 is a schematic illustration of a portion of the power distribution system shown in FIG. 4.

FIG. 5 is a schematic illustration of power distribution unit 170. Power distribution unit 170 can be operatively coupled to power source 160 (not shown in FIG. 5), communications network 110 (not shown in FIG. 5), and each of compute devices 150, 152, 154, 156. Power distribution unit 170 includes power outlets 171-180. While power distribution unit 170 is shown as having ten power outlets 171-180, power distribution unit 170 can include more or fewer power outlets. Each of power outlets 171-180 can include, or be associated with, a network address. Power distribution unit 170 is configured to receive requests (messages, signals, or information) from, and send data to, each of compute devices 150, 152, 154, 156 via communications network 110. Each of power outlets 171-180 are configured to be disabled, e.g., no longer provide electrical energy, or to be enabled, e.g., provide electrical energy, by any of compute devices 150, 152, 154, 156. As shown in FIGS. 4 and 5, each of compute devices 150, 152, 154, 156 is operatively coupled to two power outlets. Specifically, compute device 150 is operatively coupled to power outlets 171, 172; compute device 152 is operatively coupled to power outlets 173, 174; compute device 154 is operatively coupled to power outlets 175, 176; and compute device 156 is operatively coupled to power outlets 177, 178. In alternative arrangements, any of compute devices 150, 152, 154, 156, can be operatively coupled to any two of, any one of, or none of, power outlets 171-180. Access switches 120, 122, 124, 126 also can be operatively coupled to power distribution unit 170, and can interact with power distribution unit 170 in a manner similar to compute devices 150, 152, 154, 156. In some embodiments, power distribution unit 170 is operatively coupled to a combination of access switches 120, 122, 124, 126 and/or compute devices 150, 152, 154, 156.

Figure 6:
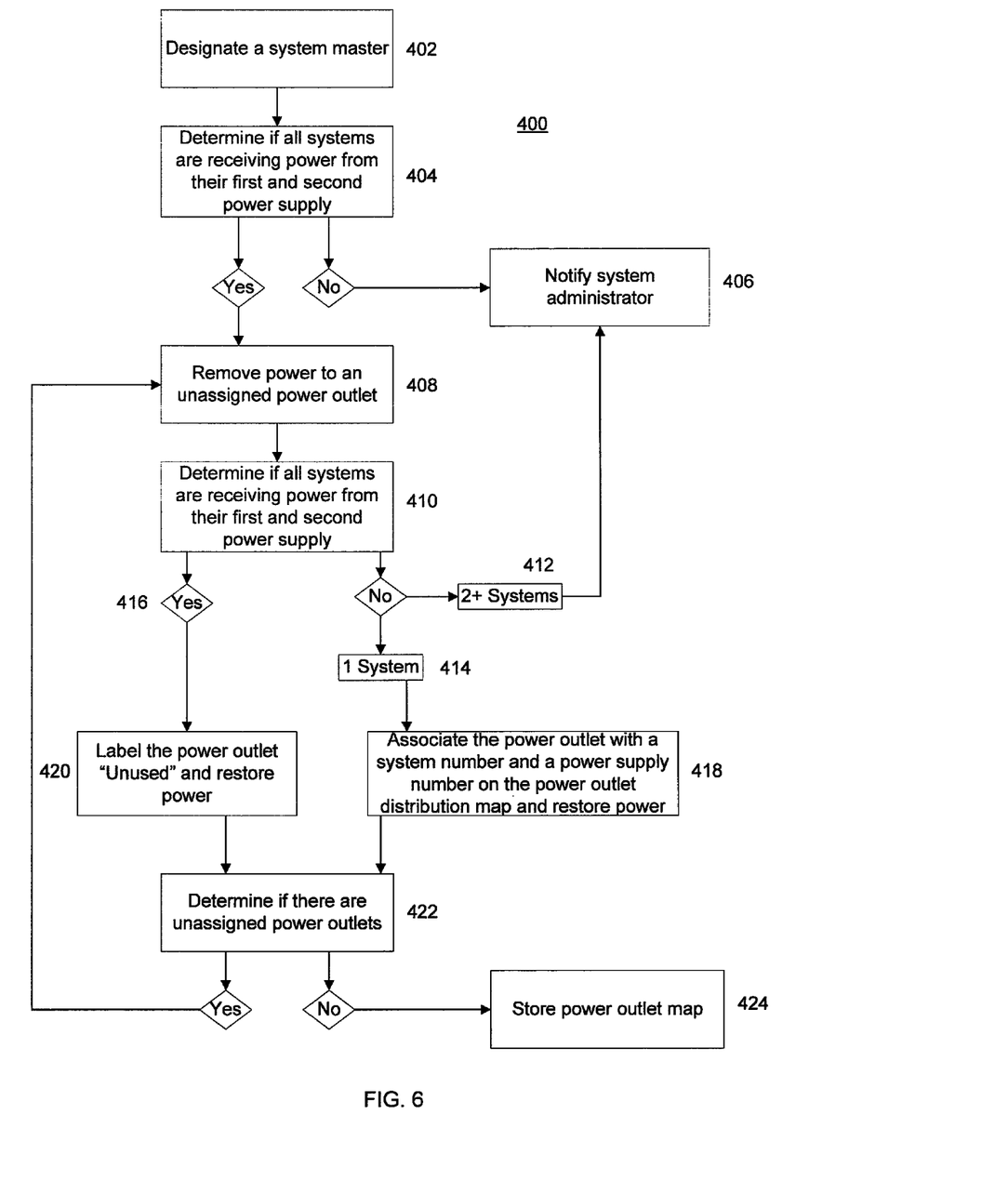
FIG. 6 is a flow chart illustrating a method of operating the power distribution system shown in FIG. 4.
Figure 7:
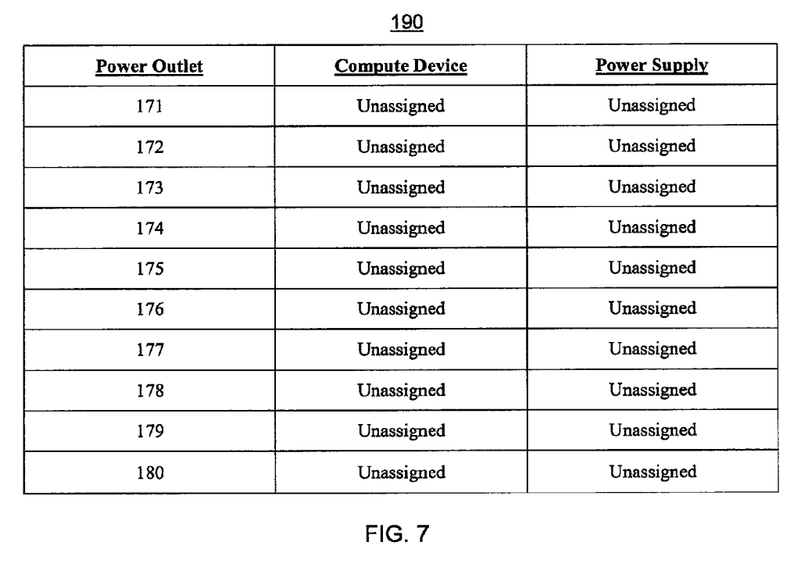
FIG. 7 is a power outlet distribution table according to an embodiment.
Figure 8:
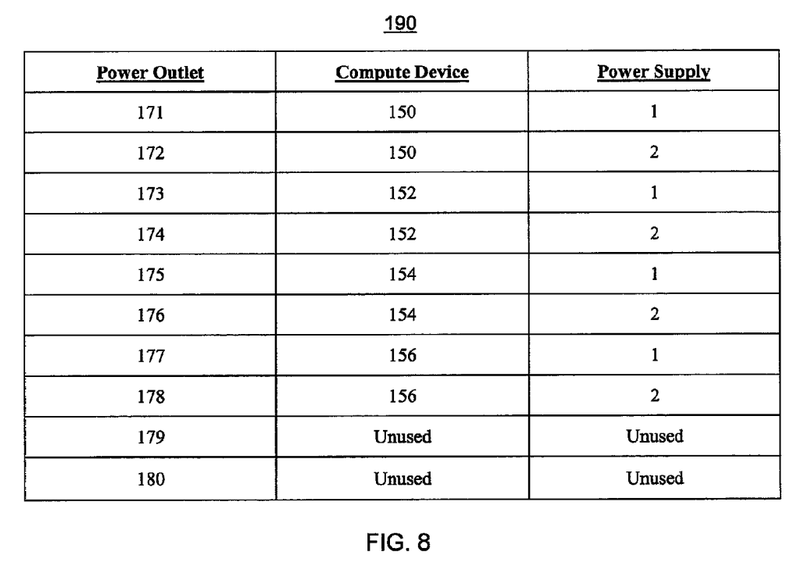
FIG. 8 is a power outlet distribution table according to another embodiment.

FIG. 6 is a flow diagram depicting a method 400 of operating the power distribution system 101 shown in FIG. 4. Specifically, method 400 can define a power outlet distribution table 190. FIG. 7 depicts the power outlet distribution table 190 showing each of power outlets 171-180 labeled as unassigned before performing method 400, and FIG. 8 depicts the power outlet distribution table 190 after performing method 400. Compute devices 150, 152, 154, 156, can designate one of the compute devices 150, 152, 154, 156, as the master compute device, and can designate the remaining of the compute devices 150, 152, 154, 156, as auxiliary compute devices, at 402. In some embodiments, the master is designated randomly. In some embodiments the master is selected based on an attribute of one of compute devices 150, 152, 154, 156. For example, the master can be selected as the compute device 150, 152, 154, 156 that is the least busy or with the most unused resources. After the master is designated, the master compute device can send a request to each of the remaining compute devices 150, 152, 154, 156 to determine that both the first power supply and the second power supply of each of the remaining compute devices 150, 152, 154, 156 is receiving power from power distribution unit 170, at 404. Additionally, the master can determine that both the first power supply and the second power supply of the master is receiving power from power distribution unit 170. If any of the compute devices 150, 152, 154, 156, are not receiving power from either of its first power supply or second power supply, the master can send a notification to a system administrator, at 406. The notification can include an indication of the affected compute device and power supply.

If all of compute devices 150, 152, 154, 156, are each receiving power from both of its first power supply and second power supply, the master can send a request to power distribution unit 170 to disable only a first of power outlets 171-180, at 408. After the power to only the first power outlet is disabled, the master can send a request to each of compute devices 150, 152, 154, 156 to determine if either of the first power supply and/or the second power supply of each of compute devices 150, 152, 154, 156 is no longer receiving power from power distribution unit 170, at 410. The master compute device can receive a "no" indication that two or more power supplies are no longer receiving power, at 412; a "no" indication that only one power supply is no longer receiving power, at 414; or a "yes" indication that all power supplies are still receiving power, at 416.

The master compute device can receive a "no" indication that two or more power supplies are no longer receiving power, at 412. Because the master compute device only disabled power to one power outlet during 408, a "no" indication that two or more power supplies are no longer receiving power indicates that more than one power supply is coupled with a single power outlet, at least one power supply has be physically decoupled from a power outlet, and/or at least one power supply has failed. The master compute device can send a notification to the system administrator, at 412. The notification can include an indication of the affected compute device(s) and power supplies.

The master compute device can receive a "no" indication that only one power supply is no longer receiving power, at 414. Because the master compute device only disabled power to one power outlet during 408, a "no" indication that one power supply is no longer receiving power indicates the affected power supply is associated with the disabled power outlet. The master compute device can define the power outlet distribution table 190 to associate the affected power supply with the disabled power outlet, and can restore power to the disabled power outlet, at 418. In some embodiments, after power to the disabled power outlet has been restored, the master compute device can send a request to the compute device including the affected power supply to confirm the affected power supply is supplying power.

The master compute device can receive a "yes" indication that all power supplies are still receiving power, at 416. Because the master compute device disabled power to one power outlet during 408, a "yes" indication that all power supplies are still receiving power indicates that the disabled power outlet is not associated with any of the power supplies of any of compute devices 150, 152, 154, 156. The master compute device can define the power outlet distribution table, can label the first power outlet as unused in the power distribution table, and can restore power to the disabled power outlet, at 420.

The master compute device can reference power outlet distribution table 190 and can determine if unassigned power outlets exist as reflected in power outlet distribution table 190, at 422. The master compute device can determine that "yes" unassigned power outlets exist and can repeat steps 408 through 416 until all of power outlets 171-180 have been associated with a compute device and a power supply, or labeled/identified unused. The master compute device can determine "no" that no unassigned power outlets exist and can store the power outlet distribution table 190, at 424. FIG. 8 depicts a completed power outlet distribution table 190 of the switch fabric system 100 shown in FIG. 4.

In an example, compute device 150 can be designated as the master compute device, and compute devices 152, 154, 156, can be designated auxiliary compute devices. This designation of master compute device and auxiliary compute devices is only for control of the power plane and does not affect a compute devices status as a primary or backup compute device for purposes of operating a portion of switch fabric system 100 as described above. Compute device 150 can receive an indication that each of compute devices 152, 154, and 156, are receiving power from both of their power supplies. Compute device 150 can send a request to disable power to power outlet 175 and can then receive an indication that the first power supply of 154 is no longer supplying power, and that the second power supply of compute device 154 is supplying power and that each power supply of compute devices 150, 152, 156, are supplying power. Compute device can define power distribution table 190 to associate power outlet 175 with the first power supply of compute device 154 (see the fifth row of entries in FIG. 8). Compute device 150 can restore power to power outlet 175 and can send a request to disable power outlet 179. Compute device 150 can receive and indication that each power supply of each of compute devices 150, 152, 154, 156 are supplying power and can define power distribution table 190 to label power outlet 179 as unused (see the ninth row of entries in FIG. 8). Compute device 150 can restore power to power outlet 179 and can continue until each of power outlets 171-180 are associated with a power supply and compute device, or are labeled unused within power distribution table 190.

Figure 9:
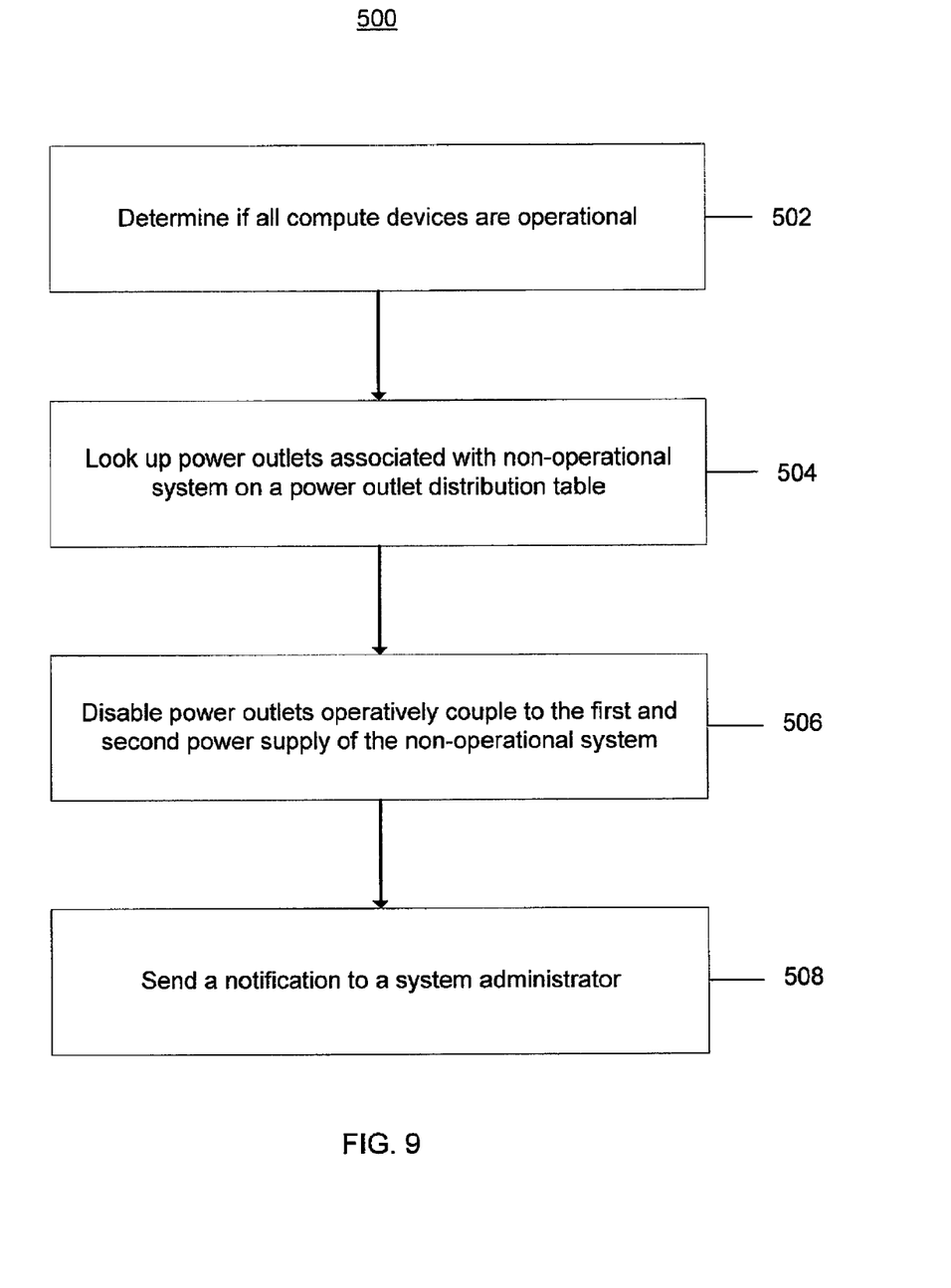
FIG. 9 is a flow chart illustrating another method of operating the power distribution system shown in FIG. 4.

Prior embodiments related to defining a power outlet distribution table 190 including power outlet/power supply combinations for power distribution unit 170 and compute devices 150, 152, 154, 156. In some other embodiments, power outlet distribution table 190 can be used to disable any of compute devices 150, 152, 154, 156. Specifically, power outlet distribution table 190 can be used to disable a compute device that is non-operational. FIG. 9 is a flow diagram depicting a method 500 of operating the switch fabric system 100 and power distribution system 101 shown in FIG. 1 and FIG. 4, respectively. During the operation of switch fabric system 100, one or more of compute devices 150, 152, 154, 156, can become non-operational, e.g., become infected by a virus, perform below a threshold, fail to answer requests to perform commands, or any other non-operational status.

The master compute device can periodically determine if each of compute devices 150, 152, 154, 156, are operational, at 502. If the master compute device determines that one of compute devices 150, 152, 154, 156, is non-operational, the master compute device can reference power outlet distribution table 190 and can determine which power outlets are supplying power to the non-operational compute device, at 504. The master compute device can send a request to power distribution unit 170 to disable power to the power outlets operatively coupled with the non-operational compute device, at 506. The master compute device can then send a notification to the system administrator indicating which compute device is non-operational and that power has been disabled to the non-operational compute device, at 508. In some embodiments, one of compute devices 150, 152, 154, 156, can be designated as the backup master compute device, can store an additional copy of power distribution table 190, can monitor the operational status of the master compute device, and can disable power to the master compute device if the master compute device is non-operational.

Referencing and expanding on the example, compute device 150 can be the master compute device and can determine whether auxiliary compute devices 152, 154, and 156 are operational. Compute device 154 can be non-operational, and compute device 150 can reference power outlet distribution table 190 to determiner that power outlet 175 supplies power to the first power supply of compute device 154 and that power outlet 176 supplies power to the second power supply of compute device 154. Compute device 150 can then send a request to power distribution unit 170 to disable power to power outlet 175 and power outlet 176, and can send a notification to the system administrator that compute device 154 is non-operational and has been powered down.

Again referencing and expanding on the example, compute device 152 can be designated as the backup master compute device and can determine whether master compute device 150 is operational. In instances where master compute device 150 is non-operational, and backup master compute device 154 can reference power outlet distribution table 190 to determiner that power outlet 171 supplies power to the first power supply of compute device 150 and that power outlet 172 supplies power to the second power supply of compute device 150. Compute device 154 can then send a request to power distribution unit 170 to disable power to power outlet 171 and power outlet 172, and can send a notification to the system administrator that compute device 150 is non-operational and has been powered down.

The master compute device can perform method 400 and/or method 500 at any time, such as, for example, any time a new compute device is added to, or removed from, network 100, at a scheduled time, at the prompting of a network administrator or other user, after an event, and/or randomly.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

By way of example, while method 400 and method 500 are described with reference to compute devices 150, 152, 154, 160, method 400 and method 500 are equally applicable to access switches 120, 122, 124, 126, and/or a combination of compute devices 150, 152, 154, 160, and access switches 120, 122, 124, 126. In some embodiments, power distribution system 101 is not limited to compute devices and/or access switches, and can be used with any components of network. In some embodiments a compute device can have one power supply operatively coupled to a power outlet in a first power distribution unit and have a second power supply operatively coupled to a power outlet in a second power distribution unit, e.g., there can be more than one power distribution unit 170. In some embodiments, system 100 can include more than one power source 160.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) configured to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software configured to perform computations on relatively heavy network workloads. In some embodiments, the services nodes can be configured to perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices configured to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a network management module configured to send a request for power output data from a first network element having a first power supply configured to be coupled to a first power outlet and a second power supply configured to be coupled to a second power outlet,
the network management module configured to receive a first confirmation from the first network element that the first power supply and the second power supply are receiving power,
the network management module configured to send a request to disable a third power outlet,
the network management module configured to receive, after sending the request to disable the third power outlet, a second confirmation from the first network element that the first power supply and the second power supply are receiving power,
the network management module configured to define a power distribution table after receiving the second confirmation, the power distribution table designating the third power outlet as unused,
the network management module configured to send, after receiving the second confirmation, a request to disable the first power outlet,
the network management module configured to receive, after sending the request to disable the first power outlet, a third confirmation from the first network element that the first power supply is not receiving power and the second power supply is receiving power, the network management module configured to further define, after receiving the third confirmation, the power distribution table associating the first power supply of the first network element with the first outlet.

2. The apparatus of claim 1, wherein the network management module is configured send a command to disable the second power outlet based on an operating condition of the first network element.

3. The apparatus of claim 1, wherein the network management module is configured to send a request for power output data from a second network element, the second network element including a third power supply configured to be coupled to a fourth power outlet and a fourth power supply configured to be coupled to a fifth power outlet.

4. The apparatus of claim 3, wherein the network management module configured to receive at a first time a confirmation from the second network element that the third power supply and the fourth power supply are receiving power, and to send a fourth request to disable the fourth power outlet.

5. The apparatus of claim 4, wherein the network management module is configured to receive at a second time after the first time a confirmation from the second network element that the fourth power supply is not receiving power and the fifth power supply is receiving power, the network management module further configured to further define, after the second time, the power distribution table associating the third power supply of the second network element with the fourth outlet.

6. A non-transitory processor-readable medium storing code representing instructions to cause a processor to:

send a request for power output data from a first network element that includes a first power supply coupled to a first power outlet and a second power supply coupled to a second power outlet;

receive at a first time a first confirmation from the first network element that the first power supply and the second power supply are receiving power;

send, after the first time, a request to disable a third power outlet;

receive, after sending the request to disable the third power outlet, a second confirmation from the first network element that the first power supply and the second power supply are receiving power;

send at a second time, after the first time, a request to disable the first power outlet;

receive at a third time, after the second time, a confirmation from the first network element that the first power supply is not receiving power and the second power supply is receiving power; and define, after the third time, a power distribution table associating the first power supply of the first network element with the first outlet and designating the third power outlet as unused.

7. The non-transitory processor-readable medium of claim 6, further comprising code representing instructions to:

cause a processor to receive an operating condition of the first network element, the operating condition being one of operational or non-operational.

8. The non-transitory processor-readable medium of claim of claim 7, further comprising code representing instructions to:

send a request to disable the first power outlet and the second power outlet when the operating condition is non-operational.

9. The non-transitory processor-readable medium of claim 7, further comprising code representing instructions to:

send a request for power output data from a second network element that includes a third power supply coupled to a third power outlet and a fourth power supply coupled to a fourth power outlet.

10. The non-transitory processor-readable medium of claim of claim 9, further comprising code representing instructions to:

send a request to disable the third power outlet and the fourth power outlet in response to an operating condition of the second network element.

* * * * *